United States Patent [19]
Kok et al.

[11] 3,747,632
[45] July 24, 1973

[54] FLUID CONDUITS

[75] Inventors: Albertus Jacobus Theodorus Kok, Nyon; Arnold Brönnimann, Petit-Lancy, both of Switzerland

[73] Assignee: IPP Industrial Polymer Processing S.A., Geneva, Switzerland

[22] Filed: Mar. 10, 1971

[21] Appl. No.: 122,690

[30] Foreign Application Priority Data
Mar. 13, 1970 Switzerland.......................... 3763/70

[52] U.S. Cl................. 137/375, 138/111, 138/109, 285/137 R
[51] Int. Cl............................ F16l 9/18, F16l 39/00
[58] Field of Search............... 138/109, 111, DIG. 1, 138/149; 285/137 R, 239; 137/375

[56] References Cited
UNITED STATES PATENTS

| 3,590,855 | 7/1971 | Woollen et al.................. 285/137 R |
| 2,314,315 | 3/1943 | Scheele....................... 285/239 X |
| 3,156,489 | 11/1964 | Deringer......................... 138/109 X |
| 3,469,863 | 9/1969 | Riester et al................... 285/137 R |
| 3,503,634 | 3/1970 | Cadiou............................ 275/137 R |

*Primary Examiner*—Henry T. Klinksiek
*Attorney*—Molinare, Allegretti, Newitt & Witcoff

[57] ABSTRACT

The invention provides firstly a multi-tube conduit sheathed in synthetic resin foam, the surface of the foam providing the outer surface of the conduit; secondly a method of making the conduit involving the use of two coupling plates, with which the conduit ends are preferably provided, to define the ends of a forming head into which a molten mixture of synthetic resin and foaming agent is extruded to form the sheath, the tubes being secured at one end in holes formed in one plate and extending slidably through holes in the other plate; and thirdly a connecting device which includes one of the plates and further includes fittings which are partly inserted in the tube ends and pushed into enlarged cavities at the front or outside ends of the plate holes.

19 Claims, 4 Drawing Figures

FLUID CONDUITS

This invention relates to fluid conduits.

In various fluid conveying systems, it often happens that several tubes for gases and/or liquides have a common path. This is for instance the case in various large public establishments, in particular some new hotels presently being built, where beverages, that are prepared or stored at some central location, are fed by means of pumps through tubes from this central location to several remote tapping points in various bars and restaurants. When the beverages consist of cool drinks a heat-insulating covering becomes essential so that they do not lose their freshness on the way.

To facilitate the installation of such a network, it has already been proposed to use conduits grouping together several tubes, the envelope of the conduit consisting of a tube of large diameter and the space between the sheath-forming outer tube and the fluid-conveying inner tubes being filled with a heat-insulating material, e.g., an expanded material.

The manufacture of such a conduit is relatively complex and one object of the present invention is to provide a conduit for fluids of this kind which is of simpler construction, which is easier to handle and which is more economical to produce.

The conduit for fluids provided by the invention comprises a plurality of flexible tubes embedded in a synthetic resin foam forming a pliable sheath with the surface of this sheath forming the outer surface of the conduit. The surface of the sheath is preferably made to form a skin.

The invention also provides a method of making such a conduit in a particularly simple manner, in particular by using the component elements of a connecting device with which the conduit is preferably fitted, this device also enabling the conduit to be connected to a similar conduit.

The method provided by the invention comprises slidably threading a plurality of tubes at one of their ends through a corresponding number of holes formed in a first plate or coupling plate, securing these ends to a second plate or coupling plate, placing the first plate at one end of a stationary passage having a relatively short length in relation to the conduit to be produced and having a cross-section corresponding to that of said plates, thereby to close off said one end of the passage, placing the second plate at the other end of the passage thereby to close off said other end, fixing the first plate in relation to the first end of the passage, and introducing under pressure a molten mixture of synthetic resin and foaming agent into said passage.

The connecting device forms a further aspect of the invention. The connecting device provided by the invention is intended for at last one end of a conduit having a plurality of flexible tubes and serves to connect the conduit to a similar conduit provided at its corresponding end with a compatible connecting device; it comprises a coupling plate formed with a plurality of holes through which the tubes can pass and a plurality of fittings for securing the tubes in the holes, the said holes including enlarged diameter portions forming cavities opening in the front face of the coupling plate, and the said fittings being intended to be inserted at least partly, at the front side of the plate, into the corresponding ends of the tubes after the latter have been passed through the holes, the said fittings being accommodated in the said cavities to secure therein the said ends.

In the accompanying drawings, given by way of example:

Figure 1:
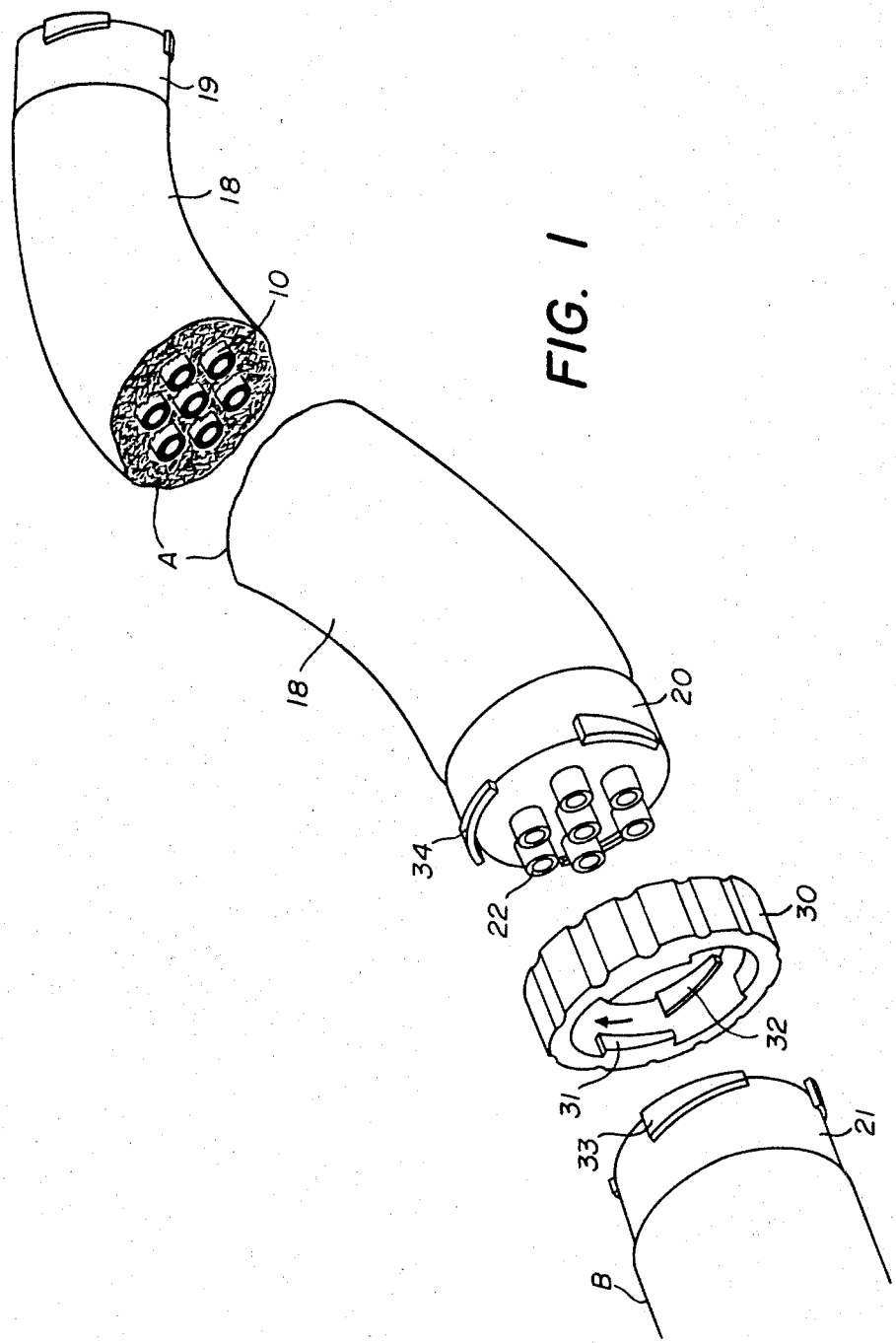
FIG. 1 shows, in perspective, in the right-hand part thereof, the two end portions of one possible form of embodiment of the conduit according to the invention, the intermediate portion having been broken away, and, in the left-hand part thereof, one end part of a similar conduit and a fixing or locking ring serving to secure the adjacent ends of these two conduits.

The conduit, referenced A, of which the two end portions have been represented in the right-hand part of FIG. 1, comprises seven flexible tubes 10 symmetrically distributed within a pliable sheath 18, the tubes and the sheath all having here a circular cross-section.

At the opposite ends of the conduit A are provided two circular coupling plates 19 and 20, with plate 19 playing the part of a female coupling plate and plate 20 playing the part of a male coupling plate intended here to be connected to a female coupling plate 21, identical to the plate 19, provided at the adjacent end of the conduit B of which one end portion is visible in the left-hand part of FIG. 1.

Figure 2:
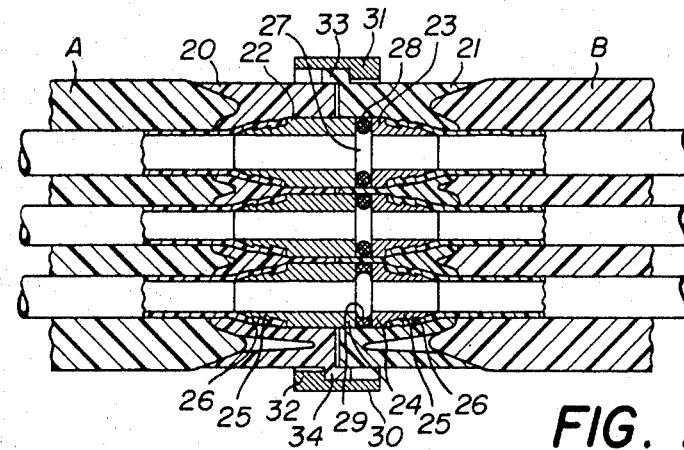
FIG. 2 shows, in axial section, the two end portions on opposite sides of the fixing ring that is visible in FIG. 1, coupled to each other and secured together by means of this ring.

The manner in which the coupling plates 20 and 21 are connected is illustrated in FIG. 2. As can be seen, each of the tubes comprised by the conduits A and B terminate in the coupling plates 20 and 21, where their ends are threaded through holes and are fixed to fittings 22 and 23. These fittings each have at the front a smooth cylindrical portion 24 and at the rear a notched frusto-conical portion 25 over which the end of the corresponding tube is force-fitted so as to be retained by the peripheral ridges 26 formed by the notches made in the outer surface of the fittings.

The fittings 22 and 23 are housed in cavities 27 which are identical in both coupling plates 20 and 21 and which form a front, enlarged diameter, part of the holes. These cavities 27 each have, firstly, a smooth cylindrical portion which opens in the front face of the plates and which is intended to receive the portion 24 of a fitting 23, this smooth cylindrical portion having a diameter approximately equal to that of the portion 24, and, secondly, a frusto-conical portion intended to receive the portion 25 of this fitting 23 and being so dimensioned that it will receive not only this portion 25 but also the flared end of the tube which is slipped thereover. The frusto-conical portion of each cavity 27 is preferably also notched, depending on the material being used for the tubes, so as to form ridges and thus to enable the fittings 22 and 23 to be locked once pushed into the cavities 27 of the coupling plates. The cylindrical portions of the fittings 22 are much longer than the cylindrical portions of the fittings 23. This enables their fore-ends to project from the front face of the coupling plate 20 and hence to provide the latter with its male characteristic, whereas in the case of the female coupling plate 21, the fore-ends of the cylindrical portions of the fittings 23 stop well short of the front face of the coupling plate 21 to enable the insertion of the projecting fore-ends of the fittings 22.

To ensure fluidtightness of the connections which are established between the tubes of conduits A and B, the lengths of the portions 24 of fittings 22 and 23 are so calculated as to leave between their fore-ends within the cavities 27 of the female coupling plate 21 free spaces in which are inserted sealing rings 28 and 29. These rings can, for instance, be toroidal, as shown at 28, or be formed with flanges on the inside, as shown at 29. In either case, these rings 28 and 29 are meant to be compressed between the fittings 22 and 23 to avoid any fluid leakage out of the tubes 10. As is apparent from FIG. 2, the internal dimensions of the tubes 10, of the fittings 22 and 23 and of the rings 28 and 29 are such that they do not form diametral variations likely to slow down to any appreciable extent the flow of a liquid being conveyed through the conduits.

Once the conduits A and B have been connected, they are secured to one another by means of clamping and fixing means. These means include a ring 30 formed along its inner periphery with two series, 31 and 32, of three teeth each, respectively intended to engages two series, 33 and 34, of three teeth each also, one being formed along the periphery of the coupling plate 20 and the other being formed along the periphery of the coupling plate 21. All of these teeth are similar and have an inoperative front surface which is here parallel to the plane of the corresponding front face of the member bearing them, and an operative surface which lies behind this inoperative surface and which is inclined in relation to the latter. Further, the teeth of the various series are sufficiently spaced apart from each other to enable two series intended to cooperate first to interpenetrate each other in the axial direction. Once this interpenetration has been effected for the two pairs of series involved — this operation taking place when the plates 20 and 21 are being coupled — the ring 30 is rotated in the direction of the arrow thereby causing the operative surfaces of the teeth 31 to engage those of the teeth 33 and the operative surfaces of the teeth 32 to engage those of the teeth 34, such engagement taking place from the narrow ends of the teeth. When sliding over each other, these operative surfaces, which form as it were cams, cause the front faces of the coupling plates 20 and 21 to move closer to each other against the crushing resistance offered by the sealing rings 28 or 29. The slopes of these operative surfaces are sufficiently slight to prevent accidental release. However, as an additional precaution, to ensure a positive locking action between the teeth, the operative surfaces of the latter can have a saw-toothed configuration. As will be observed from FIG. 1, the series of teeth 31 is angularly offset in relation to the series of teeth 32 so that the latter may lie opposite the spaces existing between the teeth 31.

These clamping and fixing means have the advantage of enabling the two conduits A and B to be fastened or unfastened very quickly. However, to avoid a problem which the teeth 33 and 34 as illustrated would cause in a practically continuous manufacturing process of the above described conduits, it may be preferred to resort to other constructional forms for the clamping and fixing means, such as the variant illustrated in FIG. 3 which enables this problem to be overcome, as will be seen later.

Figure 3:
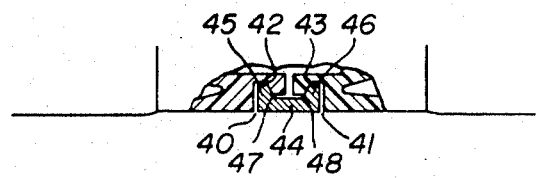
FIG. 3 shows, in axial section and partially, a variant for the connecting means and for the fixing ring that are visible in FIG. 2.

In this variant, the two coupling plates are formed near their front faces, with identical peripheral grooves 40 and 41, the front surfaces 42 and 43 being rearwardly inclined depthwise. These grooves 40 and 41 serve to accommodate a split ring 44 which is formed along its edges, on the inside thereof, with circumferential flanges 45 and 46. The adjacent surfaces 47 and 48 of these flanges are inclined so that they may cooperate with the sloping surfaces 42 and 43 when the ring 44 is being mounted and that the front faces of the coupling plates may be caused to move closer to each other, as in the previous case, when the ring 44 is tightened, through reduction of its diameter. To avoid having any projecting parts when the two conduits are fastened to each other, for example to enable these conduits to be slipped without interference into a hole having a diameter only very slightly larger than that of the conduit, the diameter of the front faces of the two coupling plates is reduced slightly to enable the ring 44 to be completely embedded, as shown in FIG. 3. A similar solution could also be adopted for the clamping and fixing means illustrated in FIG. 2, i.e., the diameter of the front portions of the coupling plates 20 and 21, bearing the teeth 33 and 34, is made sufficiently less than that of the remainder of the plates for the teeth 33 and 34 not to be projecting radially and can even be made sufficiently less for the ring 30 not to be projecting radially either, once in position.

Figure 4:
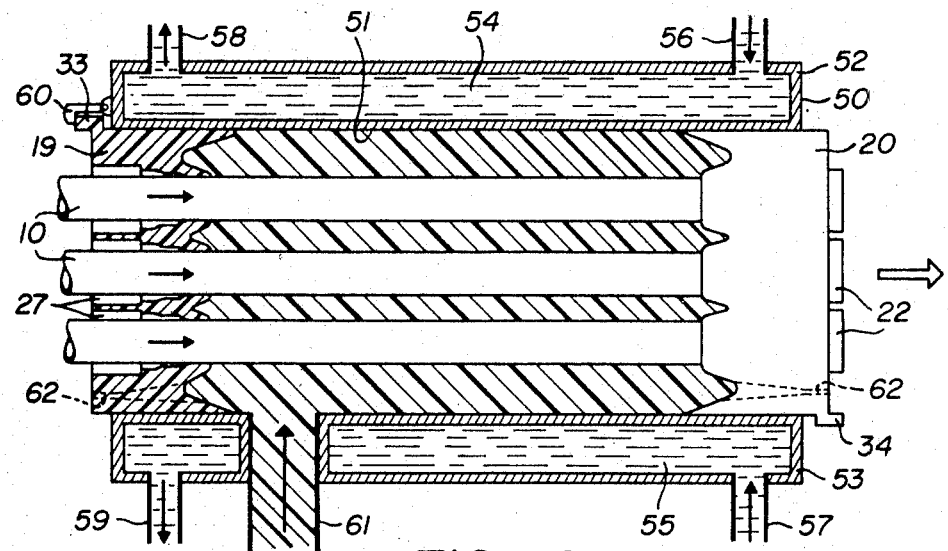
FIG. 4 shows, in section, a forming head used to manufacture a conduit such as that shown in FIGS. 1 and 2.

A preferred method of making a conduit such as the conduit A visible in FIGS. 1 and 2 is illustrated by FIG. 4. This method involves a forming head 50 through which extends a cylindrical passage 51. For a conduit having a diameter of about 8 cm, the head 50 could have a length of about 20 cm or even less. This head 50 is made up of two halves 52 and 53 hingedly mounted on one another to enable the head to be opened. Each half is here provided with a water-cooled jacket 54, 55, the water entering the jackets at 56 and 57 and issuing therefrom at 58 and 59. The diameter of the passage 51 corresponds to that of the sheath 18 and of the coupling plates 19 and 20 of the conduit that it is desired to produce.

Before proceeding to describe the method, it should be noted that for reasons of convenience the reference numbers used for the elements associated with the coupling plate 21 in FIG. 2 have again been used for the corresponding elements of the coupling plate 19, since the latter will play the same female part as the plate 21.

Further, as regards the materials used for the various elements and constituents of the conduits A and B described above, the following indications should still be given.

For the tubes 10, the fittings 22 and 23, and the sealing rings 28 and 29, i.e., all the elements intended to come into contact with the fluids conveyed by the conduits A and B, the materials selected depend on the nature of the fluids. Thus, if beverages are to be conveyed, the materials used must not impart any taste to them, and if corrosive fluids are to be conveyed, the materials used must be able to resist them. Since different liquids will generally be conveyed by one conduit, it may be necessary to use different materials for the different tubes of the conduits and for the fittings and sealing rings associated therewith. In the case of the tubes and of the sealing rings, these must moreover be flexible and deformable. That is why these elements are preferably made from synthetic resins, e.g., a copolymer of ethylene and vinyl acetate, a polyethylene, a polyamide, a polyvinyl chloride or a fluorocarbon, in particular a copolymer of polytetrafluoroethylene and hexafluoropropylene. However, the tubes and the sealing rings could also be made of rubber and even, in the case of the tubes, be made of thin-walled stainless steel. When beverages are to be conveyed, the tubes preferably have an internal diameter of about 9 mm and when these tubes are made of synthetic resin they preferably have an external diameter of about 12 mm. In the case of the fittings, these are preferably rigid. They may for instance be made from metal, such as stainless steel, or from synthetic resins, e.g., a polyamide, a polyacetal or a polycarbonate.

As for the coupling plates, these can be made from metal, e.g., cast aluminium, or from a synthetic resin, such as a polyacetal, or from a glass fibre reinforced polyamide. These latter two materials are also the preferred materials for the fixing ring 30, whereas a metal is preferably used for the fixing ring 44 (FIG. 3).

As regards the sheath of the conduit, it is made from a pliant foam of extrudable or injectable synthetic resin, e.g., a polyolefin or polyurethane foam.

To get the method under way, the required number of tubes 10, here seven, are threaded through two coupling plates 19 and 20, e.g., made of a glass fibre reinforced polyamide, set back to back. It will be supposed that the tubes are here made of a polyethylene. "Long" fittings 22, e.g., made of a polyacetal, are then driven into the tube ends on the plate 20 side and these ends, together with their fittings, are in turn driven into the cavities 27 of plate 20, the peripheral ridges 26 coming into engagement with the ridges between the notches formed in the frusto-conical portion of the cavities 27 through the intermediary of the flared ends of the tubes, the material of these tubes being made to flow in the region of these ridges. The fittings 22 are then locked in the cavities 27, The male end of the conduit is thus complete.

The coupling plate 19, which is identical to the plate 20, is then made to slide along the tubes 10 over a distance corresponding to the length of the forming head 50. The latter is then opened, the two coupling plates 19 and 20 are placed in the head, together with the tubes extending therethrough, more or less as shown in FIG. 4, whereupon it is closed again. The plate 19 is then secured to the head 50, e.g., by means of a hook 60 pivotally mounted on the head 50. The other plate, 20, is left free. Inside the passage 51 the tubes 10 occupy the required positions, in which they are kept by the plates 19 and 20.

A molten mixture of polyolefin and foaming agent is then introduced by extrusion via an opening 61 which extends through the jacket 55 and which opens out near the plate 18 into the space defined by the passage 51 and by the plates 19 and 20. This melt fills the latter and exerts a thrust on the plates 19 and 20. The plate 19, because it is secured to the head 50 by the hook 60, does not move. But the plate 20, which is not secured to the head 50, tends to be chased out of the latter in the manner of a piston, dragging with it the tubes 10 that are fastened thereto, the latter being then caused to slide, through the holes of plate 19. Normally, means are provided for exerting a pull on the plate 20 so as to cause the latter to move forward at a predetermined speed, dependent on the flow-rate of the melt through the opening 61, in order that the expansion of the foam which occurs as the conduit issues from the head 50 should not result in an increase in the diameter of the sheath.

The length of the passage 51 between the opening 61 and the plate 20 is such that the jackets 54 and 56 surrounding this passage may sufficiently cool and solidify the melt from the moment it enters via the opening 61 to the moment it issues as foam from the passage 51 in the trail of the plate 20. To accelerate the cooling of the melt or foam, water can, if desired be made to flow in the tubes 10 by connecting the fittings 22 to a source of water under pressure. The speed at which the melt or foam is cooled by the jackets 54 and 55 is moreover such that a relatively dense and tough skin may form around the sheath, and yet still have the required pliability. To prevent air pockets from forming in the sheath thus produced, vent holes 62 are provided in the plates 19 and 20. As it issues from the head 50, the conduit can be made to enter directly into a water-filled cooling trough. In such an instance the length of the forming head 50 can be reduced.

The conduit thus produced can have any length since the tubes 10 can be produced as a continuous process by means of an extrusion installation upstream of the forming head 50 and since the molten mixture of polyolefin and foaming agent entering the opening 61 may also be produced continuously. Whatever the length of the conduit, the tubes 10 will retain within the sheath 18 positions that will remain practically invariable throughout the formation of the sheath.

When the conduit being made is about to reach the required length, all of the tubes 10 are cut in a common plane (or their free ends if they are already cut) so as all to have strictly the same length, whereupon "short" fittings 23 are inserted into these cut ends. The fittings 23 are then drawn by the tubes 10 into the cavities 27 of plate 19 where, under the action of the pressure of the melt entering via the opening 61 and/or the pull exerted on the other end of the conduit and by means of a pressing plate of suitable shape, they are caused to become locked in position as described in relation to the "long" fittings at the front end of the conduit. The female end of the conduit is then complete and any pull being exerted on the other end of the conduit is interrupted. The melt, however, is kept under pressure still for a short time to enable the melt that was last fed in through the opening 61 to cool and solidify in foam form. The pressure is then interrupted and the forming head can then be opened to extract the rear end of the conduit. A new conduit can then be made in the same way.

If the forward movement of the first conduit were in part achieved by a pulling action and this pulling action were applied to the conduit by means of a powered take-up winding drum, it would be possible to connect the rear female end of the conduit that has just been completed to the front male end of the conduit about to be started. If water is to be passed through the tubes 10 of the new conduit in order to cool its sheath 18, this water is fed through the tubes 10 of the first conduit.

It will thus be observed that the method of manufacture that has just been described can be made semi-continuous. However, the presence of the teeth 33 and 34 makes it necessary to open the forming head 50 at the beginning and at the end of the production of a conduit. The variant described with reference to FIG. 3 avoids this and thus enables the method of manufacture to be practically continuous since the coupling plates have no projecting part and can therefore slide through the passage 51. This makes it possible, firstly, to extract by a simple pulling action the rear end of a conduit when the latter is complete and, secondly, to connect beforehand the male coupling plate of a new conduit (with "long" fittings and tubes already in place) to the female coupling plate of the conduit about to be finished, i.e., after having set the "short" fittings 23, this male coupling plate being then pulled, together with the tubes fastened thereto, through the forming head 50 upon the finished conduit being extracted. Clearly, when preparing the new conduit, a second coupling plate will also have been mounted, the latter serving to close off the rear end of the passage 51. Clearly also, when the method is being got under way, it is possible to begin with a female coupling plate instead of a male one.

During extraction of a finished conduit, the supply of melt is of course interrupted and the link existing between the foam of the sheath and the melt inside the opening 61 is automatically sheared off.

The melt that is introduced through the opening 61 may for instance be produced as follows:

A quantity of granular Surlyn (a Du Pont de Nemours trademark for a particular form of polyolefin called ionomer) to which have been added about 10 percent by weight of Kraton (a Shell trademark for an elastomer serving to increase pliability of the foam sheath), about 5 percent by weight of bicarbonate of soda acting as a filler and also as a foaming agent, and a small amount of pigment, is fed into the hopper of an extruder having a screw divided into first and second parts, both having a length of about fifteen times the normal diameter of the screw.

The first part of the screw extends through a heated compression zone to produce a melt having a temperature of about 170° to 200° C. The second part of the screw has an initial portion of reduced diameter defining a decompression zone to enable the injection of about 7 percent by weight of Freon (a Du Pont de Nemours trademark for a fluorinated hydrocarbon) by means of a special high pressure (300 at) injection system. The Freon, which is used here as a foaming agent, is injected in liquid form but is turned to gas upon entering the decompression zone, the pressure prevailing in this zone being of the order of 100 at. The remainder of the second part of the screw is of normal diameter, extends through a second compression zone, and serves thoroughly to knead the molten mixture.

The kneaded mixture is then forced through a screen member which firstly serves to maintain back pressure in the upstream direction, and hence to prevent foaming inside the extruder, and secondly to subject the melt to a shearing action whereby a fine celled foam may be produced for the sheath.

The melt as it travels along the second part of the screw is subjected to a cooling action. In the decompression zone, the cooling action is provided by the injected Freon and in the subsequent compression zone the cooling action is provided by a water jacket surrounding this zone to remove the heat generated through kneading and to cause the melt to flow into the forming head 50 at about 120° C.

The conduits described with reference to FIGS. 1 and 2 or with reference to FIG. 3 can be modified in various ways. For instance, they may have a non-circular cross-section and/or asymmetrical tube distribution. An asymmetrical tube distribution enables two conduits to be connected in only one way. When a conduit includes, for example, tubes made of different materials to enable different fluids to be conveyed, clearly these fluids must flow in tubes made of the same material throughout the network comprising such a conduit. This asymmetrical distribution of the tubes can be obtained by arranging the holes in the coupling plates in an irregular manner or, when these holes are regularly arranged, by inserting into the ends of one or some of the tubes intended to be secured to the same plate one or more "long" fittings and into the ends of the remainder of the tubes "short" fittings, thus imparting to the plate both male and female characteristics. Connection errors can however be excluded in various other ways, for instance, in the case of the two conduits visible in FIGS. 1 and 2, by so placing the teeth provided on their coupling plates and on the ring 30 that they can only cooperate in a single position.

When the conduit is intended to convey fluids, in particular gases, at high pressure and to guard against possible leakages in the region of the clamping and fixing means, there may be provided in addition to or instead of the sealing rings 28 and 29 other sealing rings of which some are arranged in peripheral grooves formed in the cylindrical portions of the "short" fittings for cooperation with the smooth cylindrical portions of the cavities in which these "short" fittings are housed, and of which the others are arranged in peripheral grooves formed in the fore-ends of the "long" fittings 22 so as to be also capable of cooperation with the surfaces of the smooth cylindrical portions of the cavities housing the "short" fittings, subsequent to coupling together the plates provided with these fittings.

Conduits produced by the above set forth method can have many applications. Besides conveying beverages, they could also serve to convey various liquids and gases in laboratories, e.g., acids.

We claim:

1. Apparatus for transport of fluids comprising, in combination:
   a plurality of substantially parallel fluid tubes of substantially uniform length;
   first and second end plate means positioned respectively at the opposite ends of said tubes, each plate means having an outer planar surface, each of said plate means also including a plurality of openings, each opening being for receipt of one of said tubes; and
   fittings for engaging said tubes in said plate means, said fittings projecting beyond the outer planar surface of said first plate means and said fittings extending to a position short of the outer planar surface of said second plate means so as to be recessed to thereby receive projecting fittings of plate means positioned adjacent said second plate means.

2. Apparatus according to claim 1, wherein said plate openings include enlarged diameter portions forming cavities which open in the front face of the plates, the tubes being secured in these cavities by said fittings at least partly inserted in the corresponding ends of the tubes.

3. Apparatus according to claim 2, wherein the cavities each include in the vicinity of the said front face a smooth cylindrical portion followed by a frusto-conical portion, and the fittings each include, firstly, a frusto-conical portion which is formed with retaining ridges and which is inserted into one of the said corresponding ends of the tubes and is driven together with this tube end into the said frusto-conical cavity portion and, secondly, a cylindrical portion occupying at least in part the cylindrical cavity portion.

4. A conduit according to claim 3, wherein the said frusto-conical cavity portion is also includes retaining ridges.

5. Apparatus according to claim 2, which further include sealing means which are inserted in the recessed portions of said second plate.

6. Apparatus according to claim 2 including teeth gripping means about the periphery of the plates for cooperation with locking ring means capable of securing a pair of adjacent plates together.

7. Apparatus according to claim 2 including a circular groove formed in the periphery of the plates for cooperation with locking ring means capable of securing a pair of adjacent plates together.

8. An end structure for at least one end of a conduit having a plurality of flexible tubes which comprises a plate formed with a plurality of holes through which the tubes can pass and a plurality of fittings for securing the tubes in the holes, the said holes including enlarged diameter portions forming cavities opening in the front face of the plate, said fittings being inserted at least partly, at the front side of the plate, into the corresponding ends of the tubes after the said tubes have been passed through the holes, the said fittings being accommodated in the said cavities to secure therein the said ends.

9. Apparatus according to claim 8, wherein the cavities each include in the vicinity of the said front face a smooth cylindrical portion adjacent a frusto-conical portion, and the fittings each include, firstly, a frusto-conical portion which is formed with retaining edges for insertion into one of the said corresponding ends of the tubes and to be driven together with this tube end into the said frusto-conical portion and, secondly, a cylindrical portion at least partly occupying the said cylindrical cavity portion.

10. Apparatus according to claim 9, wherein the said frusto-conical cavity portion includes retaining ridges.

11. Apparatus according to claim 9 wherein the said cylindrical fitting portion is longer than the said cylindrical cavity portion thereby to project from said plate and impart to the said plate a male characteristic.

12. Apparatus according to claim 9 wherein the said cylindrical fitting portion is shorter than the said cylindrical cavity portion thereby to impart to the said plate a female characteristic.

13. Apparatus according to claim 12 including additional means for sealing inserted into the cylindrical portions of the cavities.

14. Apparatus according to claim 8 including teeth at the periphery of the plate for cooperation with a fixing ring capable of securing the said plate to an analogous plate comprising part of distinct apparatus.

15. Apparatus according to claim 8 including circular groove means in the periphery of the plate for cooperation with locking ring means for securing the plate to an analogous plate comprising part of a distinct apparatus.

16. Apparatus for the transport of fluids comprising, in combination:
a plurality of substantially parallel flexible fluid tubes of substantially uniform length; end plate means engaged with at least one end of said tubes for separating said tubes from one another; and
a synthetic resin, foam material surrounding each of said tubes, said tubes being embedded in said foam material, said combination forming a pliable conduit with the outer surface of the foam material forming the outer surface of said conduit.

17. The apparatus of claim 16 wherein said end plate means are cooperable with means for connecting said tubes individually to separate fluid transport means.

18. The apparatus of claim 16 wherein said end plate means includes means for engaging and connecting with end plate means of a connected apparatus for the transport of fluids.

19. The apparatus of claim 16 including end plate means at the opposite ends of said tubes.

* * * * *